(12) United States Patent
Tsang

(10) Patent No.: US 9,027,465 B2
(45) Date of Patent: May 12, 2015

(54) HOLDER

(75) Inventor: Ka Cheung Tsang, Utrecht (NL)

(73) Assignee: Koninklijke Douwe Egberts B.V., Utrecht (NL)

(*) Notice: Subject to any disclaimer, the term of this patent is extended or adjusted under 35 U.S.C. 154(b) by 1314 days.

(21) Appl. No.: 12/663,827

(22) PCT Filed: Jun. 11, 2008

(86) PCT No.: PCT/NL2008/050365
§ 371 (c)(1),
(2), (4) Date: Feb. 11, 2010

(87) PCT Pub. No.: WO2008/153383
PCT Pub. Date: Dec. 18, 2008

(65) Prior Publication Data
US 2010/0163440 A1    Jul. 1, 2010

(30) Foreign Application Priority Data
Jun. 11, 2007    (NL) ..................................... 1033968

(51) Int. Cl.
*A47J 31/44*    (2006.01)
*A47J 31/06*    (2006.01)
(Continued)

(52) U.S. Cl.
CPC ........... *B65D 85/8043* (2013.01); *A47J 31/005* (2013.01); *A47J 31/407* (2013.01); *B65D 81/3266* (2013.01)

(58) Field of Classification Search
CPC ... A47L 15/4445; A47J 31/005; A47G 19/16; B65D 85/8043; B65D 81/3266; B65D 81/3211; B65D 81/32; B65D 81/3216; B65D 75/36; B65D 75/30; B65B 29/02; B65B 25/067; B65B 7/2878; A23C 13/12; A24F 19/06; B65F 1/006; B29C 66/80; B05B 7/2443; E03C 1/046; A01C 23/042
USPC ........... 99/323, 295, 279; 239/310, 316, 317; 206/0.5, 219, 222, 461, 484; 53/477, 53/478; 426/115, 394, 396, 519; 220/501, 220/503, 505
See application file for complete search history.

(56) References Cited

U.S. PATENT DOCUMENTS 5,472,719 A * 12/1995 Favre .............................. 426/77
5,615,801 A * 4/1997 Schroeder et al. .............. 222/51
(Continued)

FOREIGN PATENT DOCUMENTS

DE    20 2005 004135    5/2005
EP    0 920 849 A    6/1999
(Continued)

OTHER PUBLICATIONS

International Search Report for International Patent Application PCT/NL2008/050365, mail date Oct. 7, 2008, 3 pages.

*Primary Examiner* — Dana Ross
*Assistant Examiner* — Hemant Mathew
(74) *Attorney, Agent, or Firm* — Foley & Lardner LLP

(57) ABSTRACT

A holder and method for obtaining a holder, wherein the holder is provided with a first and a second wall part. The first and second wall part are interconnected such that therebetween at least a first storage space, at least a first fluid connection and at least a first seal removable through fluid pressure and defining an opening are formed. The at least first removable connection is communication with the first storage space and seals a communication to or from the at least first fluid connection. With the method for obtaining the holder, prior to forming the connection of the first and second wall parts, a lacquer is locally applied to one of the first and second wall parts, which after connection results in a controlled reduced adhesion for obtaining the at least first removable seal. Here in the proximity of the removable seal, an additional connection of the first wall part to the second wall part is provided.

17 Claims, 3 Drawing Sheets

(51) Int. Cl.
*B65D 85/804* (2006.01)
*B65D 81/32* (2006.01)
A47J 31/00 (2006.01)
A47J 31/40 (2006.01)

(56) References Cited

U.S. PATENT DOCUMENTS

| | | | | |
|---|---|---|---|---|
| 5,842,645 | A * | 12/1998 | Degongre et al. | 239/312 |
| 6,419,166 | B1 * | 7/2002 | Brzezinski et al. | 239/310 |
| 6,698,333 | B2 * | 3/2004 | Halliday et al. | 99/295 |
| 7,328,651 | B2 * | 2/2008 | Halliday et al. | 99/295 |
| 7,640,843 | B2 * | 1/2010 | Halliday et al. | 99/295 |
| 7,650,830 | B1 * | 1/2010 | Lessis | 99/279 |
| 2004/0055948 | A1 * | 3/2004 | Blum et al. | 210/435 |
| 2006/0233921 | A1 * | 10/2006 | Mock et al. | 426/106 |

FOREIGN PATENT DOCUMENTS

| | | |
|---|---|---|
| NL | 184501 | 8/1989 |
| WO | WO 01/46037 A | 6/2001 |
| WO | WO 2005019093 A2 * | 3/2005 |
| WO | WO 2005/077811 A | 8/2005 |
| WO | WO 2005070816 A1 * | 8/2005 |
| WO | WO 2006005401 A2 * | 1/2006 |

* cited by examiner

HOLDER

CROSS-REFERENCE TO RELATED APPLICATIONS

The present application claims priority as a national stage application of International Patent Application Serial No. PCT/NL2008/050365 filed on Jun. 11, 2008; which claimed priority to The Netherlands Application Serial No. NL1033968 filed on Jun. 11, 2007, both of which are hereby incorporated herein by reference.

BACKGROUND

The invention relates to a holder of a closed type, which holder is in particular designed to be exchangeably connected to an apparatus for preparing a beverage suitable for human consumption. As a rule, such holders are formed for a considerable part as storage space and typically have a seal removable through fluid pressure and defining an opening.

Such a holder is known from Dutch patent NL184501. With this known holder, it is sometimes considered a drawback that the removable seal in the form of a tearable skin in a wall part of the storage space does not effect a communication with a fluid connection. As a result, after removal of the seal, the fluid flow cannot be guided further in a controlled manner. With yet another holder, which is formed as a blister pack from two interconnected wall parts, attempts have been made to remedy this problem by providing the holder with a storage space as well as with a fluid connection. Here, the removable seal is formed between the storage space and the fluid connection by a weakened part of the connection between the two wall parts. This weakened connection, also called "peel seal" can be obtained, for instance, by, prior to connection of the two wall parts, providing a layer of a special lacquer on at least one of the two wall parts at the location of the desired removable seal, or peel seal. As there may be a large variation in positions in which the two wall parts of the holder end up one on top of the other, the surface of this lacquer layer is to be chosen to be larger than the eventual size of the weakened connecting portion. A result thereof can be that the obtained peel seal in some cases extends undesirably close to the edge, or towards other spaces formed in the holder. This is undesired because when the seal breaks open due to fluid pressure, other parts of the holder can become damaged too and fluid can flow away in another than the intended direction or fluid connection.

SUMMARY

Accordingly, an object of the present invention is to eliminate or improve at least one of the drawbacks of the state of the art. It is also an object of the present invention to provide alternative constructions which are easier in manufacture and use and which furthermore can be manufactured relatively inexpensively. Alternatively, it is an object of the invention to provide the public with at least a useful choice.

To this end, the invention provides for a closed holder which is provided with a first wall part and a second wall part, wherein the first and the second wall part are interconnected such that therebetween at least one first storage space, at least one first fluid connection and at least one first seal removable through pressure and defining an opening are formed, wherein the at least first removable seal is in communication with the first storage space and seals a communication to or from the at least first fluid connection, wherein the removable seal is formed by a part of the connection of the first to the second wall part and wherein, in the proximity of the removable seal, an additional connection of the first wall part to the second wall part is provided.

The invention also provides a method for forming a holder provided with a first and a second wall part, wherein the first and the second wall part are interconnected such that therebetween at least a first storage space, at least a first fluid connection and an at least first seal removable through fluid pressure and defining an opening, are formed, wherein the at least first removable seal is in communication with the first storage space and seals a communication to or from the at least first fluid connection, wherein, prior to forming the connection of the first and second wall parts, on one of the first and second wall parts, locally, a lacquer is provided, which, after connection, results in a controlled reduced adhesion for obtaining the at least first removable seal and wherein in proximity of the removable seal an additional connection of the first wall part to the second wall part is provided. In practice, the location where the connection between the two wall parts is effected can be determined much more accurately than the exact location of one of the wall parts with a lacquer layer provided on a portion thereof. The invention uses this insight by avoiding difficult, additional efforts for positioning the area of the lacquer layer better or positioning the wall parts better, through the simple additional feature according to the invention.

With the method according to the invention, it may further be advantageous to form the additional connection by heating the lacquer in an area where it should not break open such that the weakening action, at least in that portion, is cancelled.

According to another aspect of the method according to the invention, it is advantageous to apply, during the additional heating, additional pressure to the location of the additional connection. The invention further provides for an invention, wherein the pressure is applied with a forming element.

BRIEF DESCRIPTION OF THE DRAWINGS

The invention will presently be described in further detail on the basis of the associated drawing, in which.

DETAILED DESCRIPTION OF THE INVENTION

Figure 1:
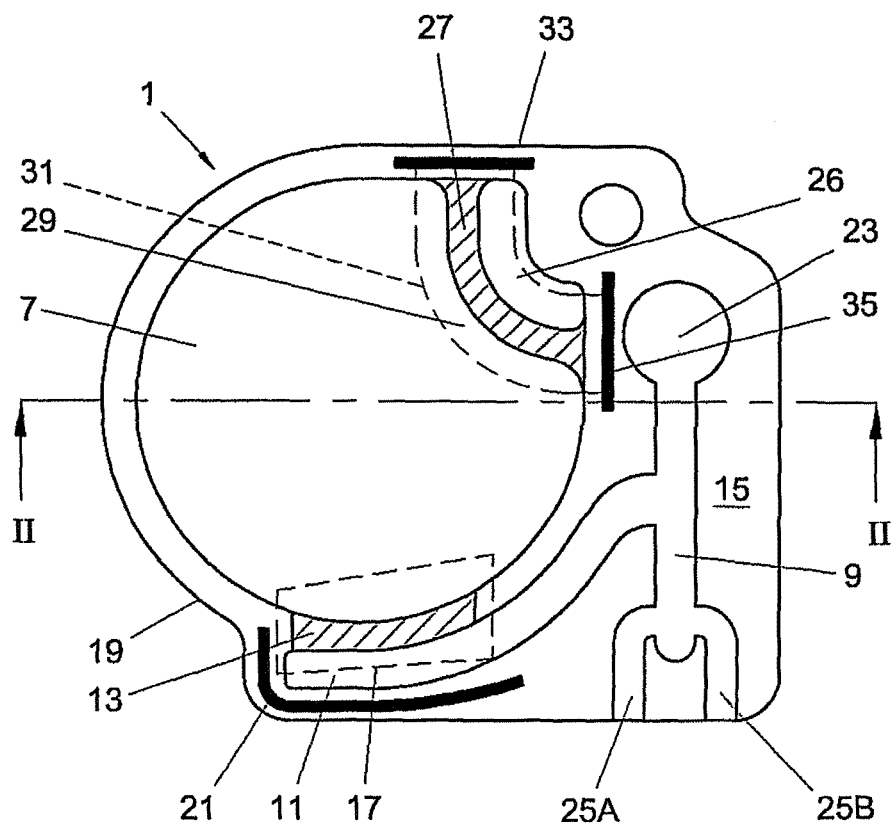
FIG. 1 shows, in top plan view, a holder of a known kind.
Figure 2:
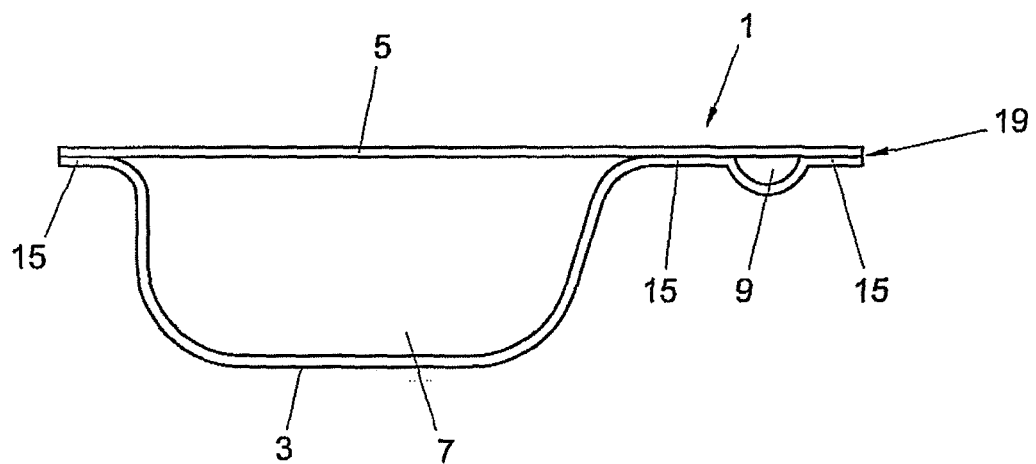
FIG. 2 shows a longitudinal cross section of the holder along the line II-II in FIG. 1.

In FIGS. 1 and 2, a first embodiment is shown of a holder according to the invention. The holder 1 is formed as a blister container with a first wall part 3 and a second wall part 5. In the first wall part 3, blister chambers 7, 9 are formed. Here, the blister chamber 7 is a first storage space while the blister chamber 9 forms a mixing chamber. As a further blister chamber, in the first wall part 3, a first fluid connection 11 is formed.

Between the first storage space 7 and the first fluid connection 11, there is a first removable seal 13. The first removable seal 13 forms part of a joint connecting surface 15 of the first and second wall parts 3, 5 and is formed as a weakened portion thereof. The wall parts 3, 5 of the holder 1 can be formed at the inside from polyethylene films of different thickness and can be interconnected through heat welding along the joint connecting surface 15. The second wall part 5 extends substantially in a single plane and can consist of a thinner film than the first wall part 3 in which the blister chambers are formed through deep drawing. Optionally, at the inside, the films for the first and second wall parts can also be formed from polypropylene. Furthermore, for the heat welding connection, use can also be made of a particular glue which is first applied on one or both of the sides facing each other of the first and/or second wall parts and is then bonded together through heating. For forming a removable seal or so-called "peel seal" in a part of the joint connecting surface 15, prior to heat welding, a layer of a specific lacquer 17 is provided which reduces the weldability of the specific connecting location in a controlled manner. This technique is already used on a wide scale and it suffices to refer to the company of Amcor Flexibles (Hattingvey 10, DK-8700 Horsens, Denmark) that is specialized in a wide range of materials and connecting techniques in this field.

Further, in FIG. 1, it can be seen that the surface part on which the lacquer 17 is applied extends over a considerably larger surface than the surface of the weakened portion forming the removable seal 13. This is so because the lacquer layer 17 is preferably applied on the flat, second wall part 5 and the eventual position of the second wall part 5 on the first wall part 3 can be arranged only within a wide tolerance. The required overmeasure to secure that the lacquer layer coincides under all circumstances with the desired location for the removable seal may be as great as 2.5 mm. Here, there is a real danger that, with a disadvantageous placing of the lacquer layer 17 relative to the circumferential edge 19 of the holder, the removable seal inadvertently brings the first storage space 7 in open communication with the outside world. This has been effectively obviated with the invention through the application of a barrier in the form of a first additional connection 21. The additional connection 21 is formed by additional heating of the edge of the holder where the peel seal 13 should certainly not break open so that the weakening effect of the parts of the lacquer layer 17 that may be present there is still cancelled. Thus, it can be securely effected that removing the peel seal 13 only results in an opening between the storage space 7 and the additional fluid connection 11.

As the storage space 7 contains a concentrate in the form of a fluid useful for the preparation of a beverage, the first removable seal 13 can for instance be opened by mechanically compressing the storage space 7, so that the fluid pressure rises and the removable seal 13 opens. Then, the fluid can flow out via the first fluid connection 11 to the mixing chamber 9 at which location it mixes with a basic fluid flowing there from a fluid dispensing chamber 23. Then, the prepared beverage can leave the holder by means of the outflow openings 25A, 25B. The embodiment shown in the Figures with two outflow openings can in practice also be replaced with a design with only a single outflow opening. In the described embodiment according to FIGS. 1 and 2, the concentrate in the storage space 7 is not displaced by the volume reduction of the storage space, but by a different fluid, such as air, that is supplied under pressure to the storage space. To this end, a second fluid connection 26 and a second removable seal or peel seal 27 are provided between the second fluid connection 26 and the storage space 7. Here, again, a lacquer layer 29 is applied to achieve the desired local weakening of the connecting surface 15. It can also be seen that the contours of this lacquer layer are in an area 31 which, in an unfavourable case, can coincide both with the circumferential edge 19 of the holder 1, and with the fluid dispensing chamber 23. In order to remedy this drawback, barriers have been created by providing second and third additional connections 33 and 35 like the earlier described first additional connection 21.

With a holder of the described type, it is not unusual, during use in a beverage preparation apparatus, to support it along the surface parts of the first wall part 3 running parallel to the connecting surface 15. For obtaining reliable fluid communications with the beverage preparation apparatus, accurate measuring can be desired. The supply of fluids to the holder is usually effected by needles that pierce one of the first or second wall parts and a proper seal can afterwards only be guaranteed by an accurately predictable size of the exchangeable holder. Therefore, it may under particular circumstances be desirable to provide an additional connection 35 in a supporting area located between two pierceable zones, such as the fluid dispensing chamber 23 and the second fluid connection 26. The third additional connection 35 could adversely affect the sizes in this critical area. The circumferential area 19 of the holder 1 is in a general sense less critical so that it may be preferred to have the locations of the additional connections coincide as much as possible with the outer circumference 19.

Figure 3:
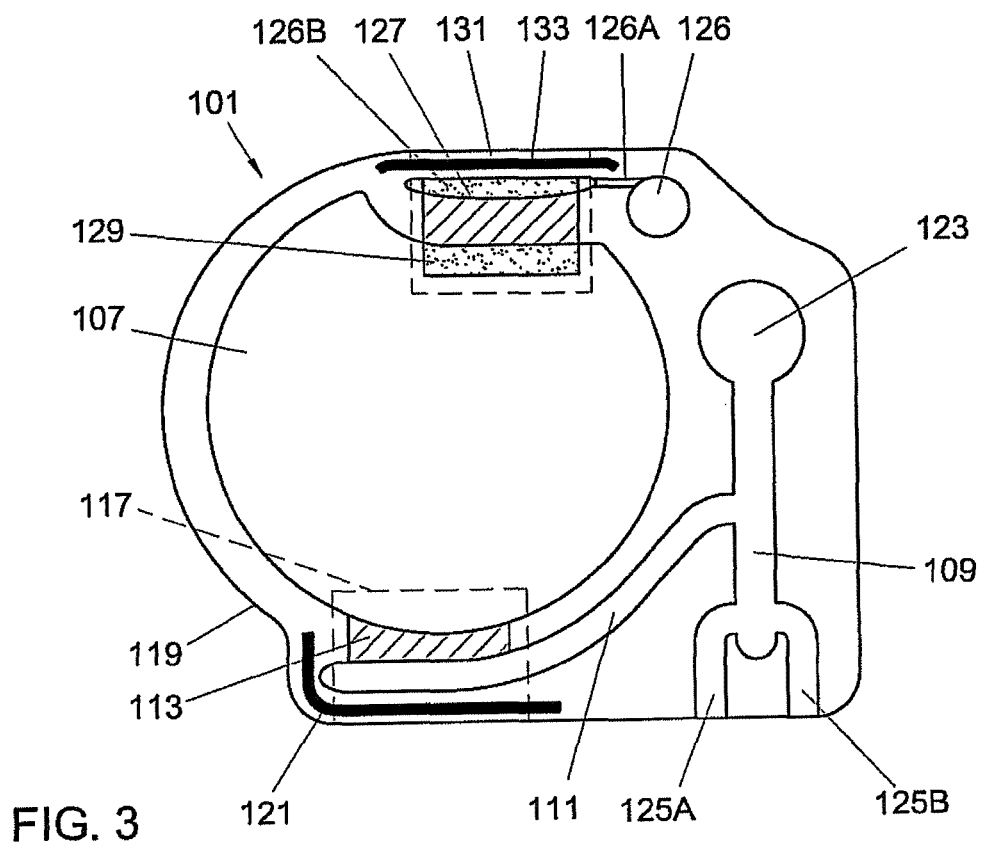
FIG. 3 is a top plan view of a holder according to a modified model.

To that end, in FIG. 3, a modified model of a holder is suggested. Here, the reference numerals are selected to be largely in accordance with FIGS. 1 and 2, but each time increased by one hundred.

The holder 101 in FIG. 3 has a second fluid connection 126 which is in communication via a channel 126A with a fluid supply chamber 126B. The fluid supply chamber 126B extends as much as possible parallel to the adjacent circumferential edge 119. Thus, it is achieved that the extreme boundary 131 of the lacquer layer 129 requires only an additional connection 133 in the non-critical area of the circumferential edge 119. Otherwise, the holder 101 of FIG. 3 does not differ from the one of FIGS. 1 and 2. Hence, an extensive description of the first removable seal 113, the first lacquer surface 117 and the first additional connection 121 is superfluous.

Figure 4:
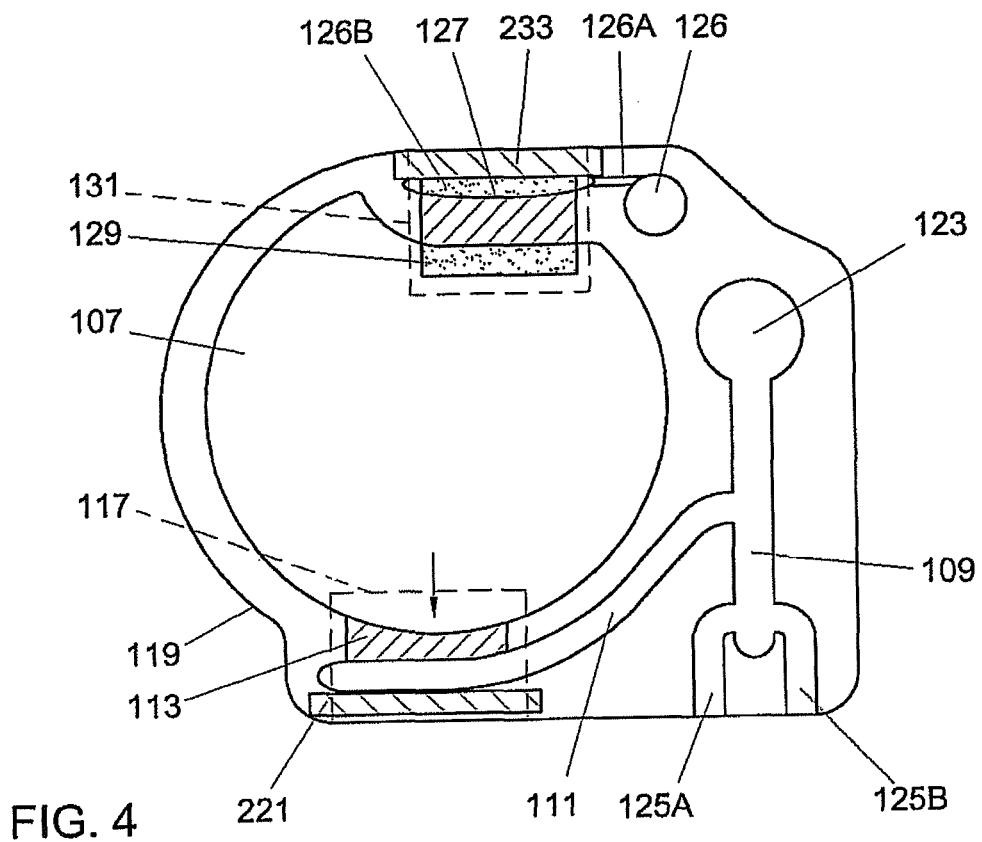
FIG. 4 is a view, like FIG. 3, of a holder according to a further modified model.
Figure 5:
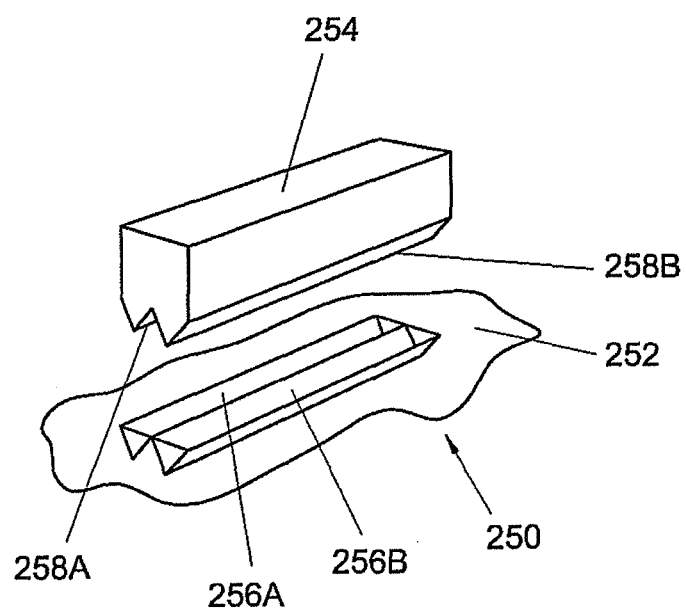
FIG. 5 is a tool for forming the modified holder according to FIG. 4.

FIGS. 4 and 5 relate to an alternative embodiment of the first and second connections. These are indicated in FIG. 4 by 221 for the first additional connection and by 233 for the second additional connection. The remaining reference numerals are in complete accordance with FIG. 3 and can be considered to be identical thereto.

The first and second additional connections 221, 233 differ from the embodiments described this far in that, during the additional heating for obtaining the additional connections 221 and 223, additionally, with a form tool 250 (see FIG. 5), a single crease or a plurality of creases are provided. To that end, the form tool 250 is provided with an anvil 252 and a stamp 254. In this example, the anvil 252 has two creased recesses 256A, 256B in which two corresponding ridges 258A, 258B of the stamp 254 can be received. Preferably, the stamp 254 and/or the anvil 252 can be heated or they form part of an ultrasonic or inductive welding device. During the additional heating for forming the additional connections 221, 233, the anvil 252 is placed under the first wall part 3 of the holder and the stamp is pressed-on against the second wall part 5. Through the applied pressure and heat, creases are formed at the location of the first and second additional connections 221 and 233. This increases the strength of the additional connections to an important extent and allows the temperature and pressure during formation of the additional connections to be less critical. As the circumferential range 119 for the seal in a beverage preparation apparatus is less critical, this connecting technique can be utilized successfully utilized.

The described holder can be used in a beverage preparation apparatus as follows.

The holder is connected to an apparatus designed for cooperation with the holder during connection of the holder 1, 101 to the apparatus or, if desired, after activation of the apparatus, the fluid dispensing chamber 23, 123, respectively, and the second fluid dispensing chamber 26, 126, respectively, are pierced and connected to fluid dispensing units of the apparatus. After activation of the apparatus, a control device will effect that air is supplied under pressure to the second fluid connection 26, 126. With it, pressure, for instance at least 0.5 bar, is applied to the second removable seal 27, 127 which will thereby open. Peel seals that open at a lower pressure are in principle possible but demand great caution upon transport and placing the holders in the beverage preparation apparatus. Then, the applied pressure is transmitted either via the concentrate in the storage space 7, 107; or directly over the liquid level of the concentrate, and opens the first removable seal 13, 113. Then, with the aid of the air supplied under pressure, the concentrate is dosed in the mixing chamber. Prior thereto or at the same time, via the fluid dispensing chamber 23, 123, the basic fluid for the beverage to be prepared flows to the same mixing chamber 9, 109, and the prepared beverage can leave the holder via the outflow openings 25A, 25B, or 125A, 125B, respectively.

It is further noted that here, the described holder is designed with a single storage space. However, it is also possible that the holder is designed to be mirrored with respect to the mixing chamber so that a second storage space is obtained which can be coupled in the same manner to the mixing chamber and in which, for preparing beverage, suitable second concentrate can be included, that can be similarly dosed.

It is suggested that the operation and the construction of the present invention will clearly show from the above description. The invention is not limited to any embodiment described herein and, within the capacity of the skilled person, modifications are possible that are understood to fall within the scope of protection. Also, all kinematic inversions should be understood to fall within the scope of protection of the present invention. Expressions such as "consisting of", when used in this description or the accompanying claims, should not be understood to have an exclusive meaning, but rather an inclusive meaning. Terms such as "means for . . . " should be read as "component formed for . . . " or "element constructed for . . . " and are to be understood to also include all equivalents for the described constructions. The use of terms such as: "critical", "advantageous", "desired" etc. is not intended to delimit the invention. Furthermore, also properties that are not specifically or expressly described or claimed in the construction according to the present invention can be comprised without departing from the scope of protection.

The invention claimed is:

1. A closed holder comprising:
   a first wall part; and
   a second wall part,
   wherein the first and the second wall part are interconnected such that at least a first storage space, at least a first fluid connection and at least a first removable seal are formed between the interconnected first and second wall part, the first removable seal being removable through fluid pressure and defining an opening when removed,
   wherein the first removable seal is in communication with the first storage space and seals a communication to or from the at least first fluid connection,
   wherein the first removable seal is formed by a part of the connection of the first wall part to the second wall part having a lacquer layer resulting in a controlled reduced adhesion,
   wherein, in proximity of the first removable seal, a first additional connection of the first wall part to the second wall part is provided, which cancels the reduced adhesion,
   wherein the first additional connection is provided along a peripheral edge of the holder, wherein the first additional connection extends a considerable extent along a circumference of the first fluid connection, and
   wherein the first removable seal is provided between the first storage space and the first fluid connection.

2. The holder according to claim 1, wherein the second wall part extends substantially in a single plane.

3. The holder according to claim 1, wherein the first and the second wall part are interconnected by a welded connection.

4. The holder according to claim 2, wherein the first removable seal is formed by a weakened portion of the welded connection.

5. The holder according to claim 4, wherein the weakened portion of the welded connection is obtained by a previously applied lacquer provided in a layer at a predetermined connecting location, wherein the lacquer reduces the weldability of the first and second wall parts at the predetermined connecting location in a controlled manner.

6. The holder according to claim 5, wherein the predetermined connecting location is tuned in length and width for forming an opening under the influence of a predetermined fluid pressure.

7. The holder according to claim 5, wherein the lacquer layer is applied in an accurately controlled thickness.

8. The holder according to claim 6, wherein a recipe of the lacquer layer is tuned to a reduced adhesion required for the predetermined fluid pressure.

9. The holder according to claim 5, wherein the previously applied lacquer layer covers a surface with a size which is an overmeasure larger than the predetermined connecting location at the location of the first removable seal.

10. The holder according to claim 9, wherein the overmeasure corresponds to a largest possible inaccuracy that can occur when placing the second wall part on the first wall part during the process of forming the holder.

11. The holder according to claim 10, wherein the overmeasure all round is up to 2.5 mm.

12. The holder according to claim 1, further comprising a second removable seal, wherein the second removable seal is removable through fluid pressure.

13. The holder according to claim 12, wherein the first removable seal provides a discharge of the first storage space.

14. The holder according to claim 12, wherein the second removable seal provides a supply to the first storage space.

15. The holder according to claim 12, wherein in proximity of the second removable seal, a second additional connection of the first wall part to the second wall part is provided.

16. The holder according to claim 1, further comprising a mixing chamber, wherein the first removable seal, when removed can effect a fluid communication from the at least one first storage space to the mixing chamber, via the at least first fluid connection.

17. The holder according to claim 12, further comprising a second fluid connection, wherein the second removable seal, when removed, can effect a fluid communication between the second fluid connection and the at least first storage space.

* * * * *